United States Patent Office 3,325,184
Patented June 13, 1967

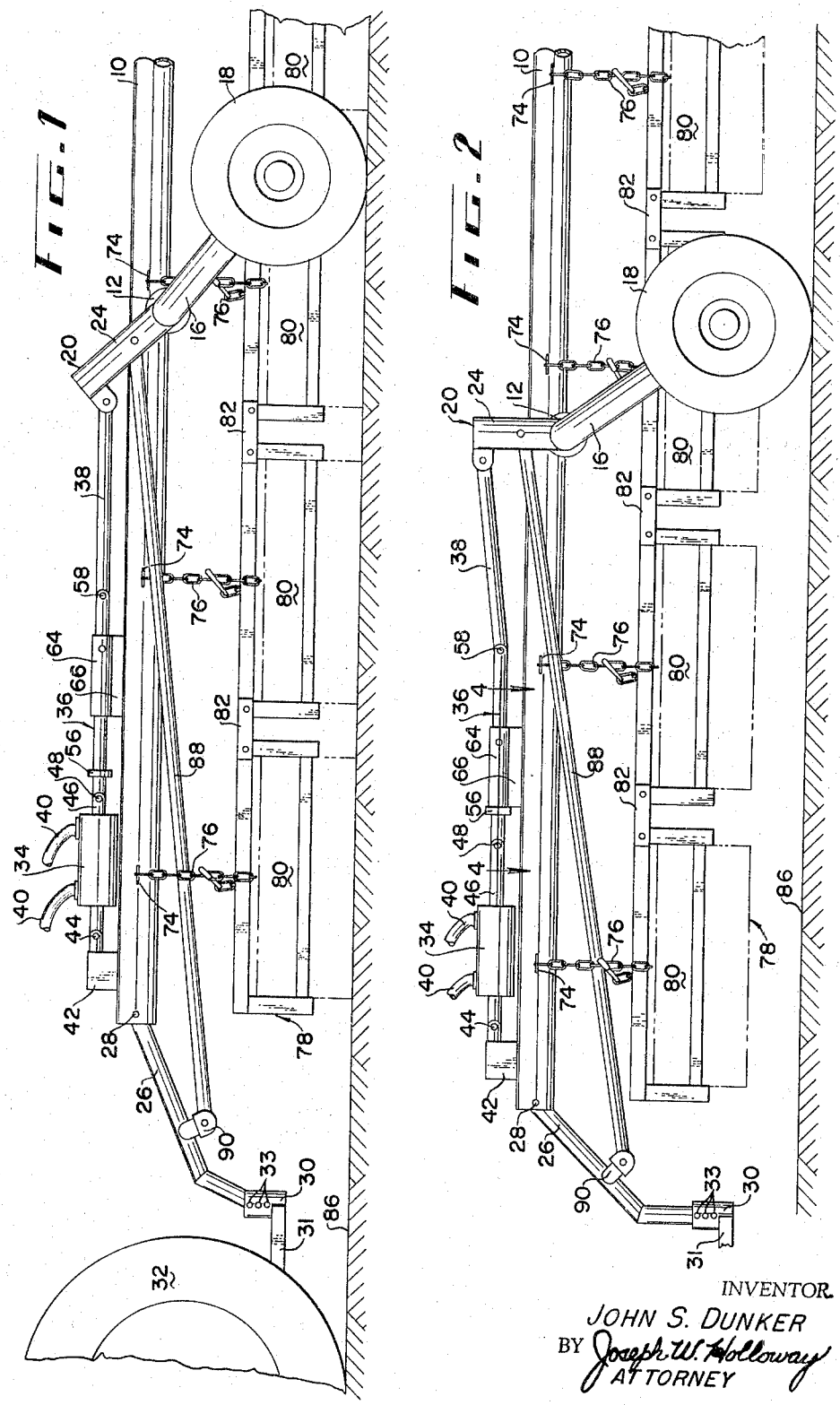

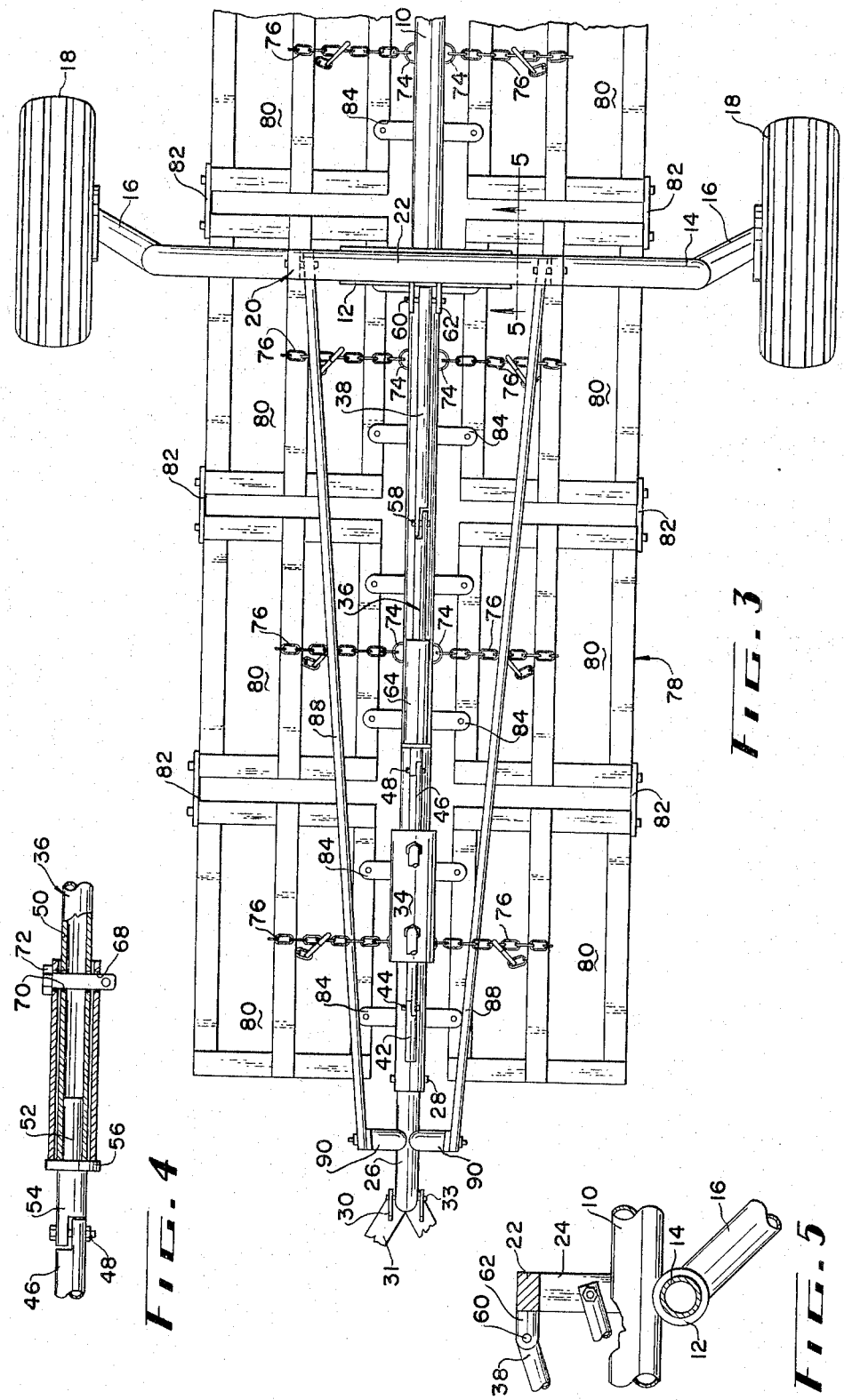

3,325,184
IMPLEMENT CARRIER
John S. Dunker, Hull, Ill. 62343
Filed Feb. 23, 1965, Ser. No. 434,323
3 Claims. (Cl. 280—414.5)

This invention generally relates to a carrier or transport for tractordrawn farm implements of the multisection type, such as harrows, disks, and rotary hoes.

While the many advantages afforded by joining several implement sections in side-by-side relation are generally well known and appreciated by farmers and implement manufacturers, certain problems are encountered in the practical employment of such implements. For example, the over-all side-to-side dimension of the fully assembled implement may achieve twenty to thirty feet or more and is typically so great that transportation of the implement over narrow country roads and lanes and through field and farm lot entrances is difficult, if not impossible, unless sections of the implement are disassembled. In practice, disassembly, transportation and reassembly of the several implement sections prove to be time consiuming, laborious and often hazardous.

Heretofore, it has been common practice to attach wheels directly and permanently to the frame of an implement by means of a cranklike axle whereby the implement can be raised out of engaging relation with the ground surface for transportation from place to place. This arrangement does not, however, represent a true carrier for transporting a selected one of several types of implements which are only temporarily attachable to the carrier.

In the past, implement carriers have been proposed for mechanically folding plural outboard implement sections upwardly and inwardly to reduce the over-all width of the implement. My United States Patent 3,156,306 discloses a typical carrier of this kind and shows that the carrier is operatively interposed between the tractor and the implement. Thus the carrier is connected in force-transmitting relation between the tractor and the implement and must be designed and constructed as a structural and functional component of the implement-tractor hookup as well as a mere carrier for the implement when the latter is being transported from place to place. It will be appreciated that, for such folding carriers to perform satisfactorily as supporting and pulling structures for a heavy multisection implement attached thereto, the carriers must be structurally strong and rugged. Moreover, such carriers conventionally transport the attached implement sections in the same general attitude as that employed when the sections are in their normal working position, i.e. the side-to-side dimension of the implement remains oriented at right angles to the path of the travel of the carrier. This operational characteristic of folding carriers limits the lateral compactness of the folded implement to the width of the sections which remain unfolded. In the case of a six section implement, for example, the two outboard sections on both sides should be folded in order to achieve a practical side-to-side dimension, i.e. the combined width of the two unfolded center increased. Furthermore, the lateral compactness of tions requires that the carrier frame and elevating mechanism be heavily constructed and necessarily involves expenditure of substantial power from the tractor hydraulic system. For the several reasons cited above, mechanical folding carriers and their equivalents are generally heavily constructed and bulky and involve high manufacturing and operational costs. Moreover, where such heavy carriers are drawn about by a tractor during cultivating operations, the cost of operating the tractor is significantly increased. Furthermore, the lateral compactness of such carriers is limited by their required dimensions and their mode of mechanical operation for folding the sections.

Therefore, a broad object of this invention is to provide an improved carrier for multisection farm implements which will effectively obviate the aforementioned shortcomings of prior art devices intended for the same general purpose.

A more specific object is to provide a carrier which is specifically designed and constructed for the single purpose of transporting multisection implements.

Another object is the provision of a carrier which can efficiently transport a multisection implement without resorting to disassembly or folding of the implement.

Still another object is to provide a carrier which supports and carries a multisection implement for transporting movement at right angles to the usual working path of the implement.

Still another object is to provide a carrier which is detachably secured to individual implement sections at spaced supporting points located along an elongate center member of the carrier.

Yet another object is the provision of a carrier which may be detachably secured to any type of multisection implement having an extremely wide over-all width.

A more specific object is the provision of a carrier of the aforedescribed type which is characterized by light and compact construction, easy operation, and low initial cost.

These and other objects and advantages will appear upon reading the following detailed specification and the appended claims and upon considering in connection therewith the accompanying drawings, in which:

FIG. 1 is a fragmentary side elevation showing a carrier constructed in accordance with my invention attached to a tractor and in the implement-loading position;

FIG. 2 is a view similar to FIG. 1 showing the carrier in the implement-transporting position;

FIG. 3 is a fragmentary plan view showing the carrier in the implement-transporting position;

FIG. 4 is an enlarged view taken generally along lines 4—4 of FIG. 2; and

FIG. 5 is an enlarged view taken generally along lines 5—5 of FIG. 3.

As best shown in FIG. 3 of the drawings, the carrier includes an elongated center member 10 which may comprise a common metal pipe having suitable strength and stiffness properties. A short journal pipe 12 is transversely attached to the center member 10 at a selected point intermediate the ends of the latter by welding or the like. It is contemplated that the center member's length will be several times the length of the journal pipe 12. As shown in FIG. 5, an axle 14 having an exterior diameter generally conforming to the interior diameter of the journal pipe 12 is journaled within the latter for pivotal movement. Downwardly depending legs 16 are rigidly attached to the opposite ends of the axle 14 which extend laterally beyond the ends of the journal pipe 12. Ground-engaging wheels 18 are attached to the lower ends of the legs 16 and comprise the main load-bearing means for the carrier and the implements attached thereto. Preferably, the journal pipe 12 and the axle 14 are located at or near the midpoint of the center member 10 thereby placing the wheels 18 slightly to the rear of the center member's midpoint.

An inverted U-shaped frame is indicated generally by numeral 20 and comprises a cross member 22 having downwardly depending parallel arms 24 rigidly secured at its opposite ends. The arms 24 have their lower ends rigidly attached to the axle 14 at points laterally spaced from the terminations of the journal pipe 12. From the foregoing description, it will be understood that the frame 20, the axle 14 and the legs 16 comprise a cranklike member which is pivotally journaled with respect to the center member 10.

A towing tongue 26 comprising a pipe or the like is received in the forward end of the center member 10 and is pivotally secured therein by a cross pin or bolt 28 fitted through aligned transverse apertures in adjacent ends of the tongue and center member. The forward end of the tongue 26, i.e. the end nearer to the tractor 32, is releasably secured to a clevis 30 on the tow bar 31 of the tractor 32 by a pivot pin 33 or by any equivalent means providing a pivotal pulling connection with the tractor.

Means for effecting pivotal movement of the axle 14 within the journal pipe 12 are carried by the center member 10 between its forward end and the frame 20. This means includes hydraulic power cylinder 34, a telescoping push rod 36 and a connecting rod 38 which are in axial alignment and which are generally in spaced parallel relation with the center member 10. Preferably the hydraulic cylinder 34 is of the double acting type and is connected by lines 40 to the hydraulic power system, not shown, of the tractor 32. The hydraulic cylinder 34 can be of any well-known type commonly employed with hydraulically powered farm equipment. The cylinder 34 is detachably secured to a lug 42 projecting from the center member 10 by means of a pin or bolt 44 and the extensible piston rod 46 of the cylinder is detachably secured to the push rod 36 by a pin or bolt 48. The telescoping push rod, which has been indicated in its entirety by numeral 36, preferably comprises a tubular member 50 which slidably receives within its forward end a reduced diameter segment 52 of a member 54. As shown in FIG. 4, an enlarged collar 56 formed integrally with member 54 bears against the extreme forward end of member 50. The advantage derivable from the telescoping push rod 36 will be fully explained hereinafter. The tubular member 50 of the push rod 36 is pivotally connected to the connecting rod 38 by a pin or bolt 58 penetrating aligned apertures in the adjacent ends of these elements. The rear end of the connecting rod 38 is pivotally connected at the center of the cross member 22 by a pin or bolt 60 to a clevis 62 projecting forwardly from the frame 20. The push rod 36 is slidably journaled within a sleeve 64 which surrounds the tubular member 50; the sleeve 64 being rigidly secured to the center member 10 by a depending base 66. For a purpose to be described, the sleeve 64 and the tubular member 50 are provided with transverse apertures 68 and 70, respectively, which may be aligned, as shown in FIG. 4, to receive a removable securing pin 72.

A plurality of split chain links 74, or equivalent anchoring means, are rigidly secured to the center member 10 at spaced intervals and provide means for attaching one end of a load-bearing chain 76 to the center member. Each of the several chains 76 is provided with a conventional hook at its free end which may be removably secured back upon an intermediate portion of the chain. As will hereinafter appear, the length, strength and number of chains employed should be such that implements of various sizes, shapes and weights can be securely attached to the center member 10 by all or part of the chains 76. Moreover, equivalent flexible members, such as cables or ropes, could be used in place of the chains.

Numeral 78 indicates a multisection implement in its entirety. The implement 78 is shown only in diagrammatic form since it is anticipated that the carrier may be employed to equal advantage for transporting any one of several types of sectional farm equipment such as disks, harrows, rotary hoes, etc. In the drawings, the rear portions of the center member 10 and the implement 78 are broken off; however, it will be understood that the length of the center member and the side-to-side dimension of the implement are substantially coextensive and that the journal pipe 12 is near the midpoint of the center member. The frames of individual implement sections 80 are ganged together laterally, i.e. in side-by-side relation as shown in FIGS. 1 and 2, by connecting links 82; and where more than one row of implements is employed, the rows are ganged in tandem by connecting links 84 shown in FIG. 3. It will be appreciated that any number of sections 80 can be joined to form many different implement arrays; however, the usual arrangement comprises one row or two tandem rows of four to eight sections per row. In the illustrated embodiment of the invention, two six-section rows in tandem comprise the implement 78.

The normal path of travel of the implement 78 while being drawn by a tractor to perform its intended working function is at right angles to the side-to-side dimension of the rows of implement sections 80. However, with the implement 78 detached from the tractor and resting upon the ground surface 86 in the manner shown in FIG. 1, the carrier is positioned by the tractor 32 above the implement to be loaded so that the latter is straddled by the wheels 18 and the longitudinal centerline of the center member 10 is parallel with and directly above the longitudinal center line of the implement, as seen in FIG. 3. Thus, it is contemplated that the present carrier will transport the implement 78 in a path which is at right angles to or sideways to the intended working path of the implement. Preferably the journal pipe 12 is disposed substantially above the center of weight of the implement 78. Thus, the carrier would be located by the tractor 32 preparatory to loading the twelve section implement 78 so that six of the sections 80 are disposed forwardly of the journal pipe 12 and a like number of sections rearwardly thereof. In this manner the weight of the several sections is distributed more or less evenly along the entire length of the center member 10 and the moments of rotation of the load about the axle 14 are substantially balanced.

With the carrier positioned with respect to the implement 78 in the afore-described manner and with the operating elements of the carrier in the loading position shown in FIG. 1, the several chains 76 are manually attached to the sections 80 at convenient points of good support. Preferably, the chains are made taut by appropriate placement of the chain hooks back upon the chain in the manner shown in FIG. 1. In the loading position of the carrier, the wheels 18 have pivoted substantially to the rear of the axle 14 and the frame 20 is pivoted forwardly about the axle. The front end of the center member 10 is supported by the tongue 26 and tractor 32 so that the center member is substantially parallel with the ground surface 86. Preferably, the drawbar clevis 30 is provided with a series of apertures to permit leveling of the center member 10 in the carrier loading position. A pair of tie rods or leveling rods 88 are pivotally connected between each of the frame arms 24 and a pair of laterally extending arms 90 secured to the tongue 26 to limit the clockwise pivoting movement of the tongue about the pin 28.

The hydraulic power cylinder 34 is operable by means of the usual controls, not shown, on the tractor 32 to effect raising of the center member 10 and the attached implement 78 from the loading position shown in FIG. 1 to the transporting position shown in FIG. 2. Thus, powered extension of the piston rod 46 will move the push rod 36 and the connecting rod 38 rearwardly causing clockwise pivotal movement of the frame 20, the legs 16 and the wheels 18 about the axis of the axle 14. With the piston rod 46 extended, the wheels 18 will be drawn forwardly causing the center member 10 to raise a predetermined distance whereby the implement is raised the same distance above the ground surface 86.

A feature of this invention resides in the provision of the aforementioned leveling rods 88 which serve to raise the front of the center member 10 at the same time the wheels 18 are operable to raise the center and rear portions of the center member. Thus the aforedescribed clockwise pivoting of the frame arms 22 will exert a rearward pull on the arms 90 causing the tongue 26 to pivot counterclockwise about pin 28 to the position shown in FIG. 2. By means of this leveling linkage the front of the center member 10 can be raised simultaneously with the clockwise pivoting of the wheels 18 to maintain all of the implement sections 80 in substantial parallelism with the ground surface 86 thereby providing a good transporting attitude for the implement 78.

Upon reaching the final destination of the carried implement, the hydraulic cylinder 34 is powered to retract the piston rod 46 whereby the wheels 18 are pivoted counterclockwise and the tongue 26 is pivoted clockwise to lower the center member 10 and the attached implement 20 to the position shown in FIG. 1. If the cylinder 34 is single acting, the weight of the carrier and the implement 78 will collapse the same due to the normal forward thrust imparted to the connecting rod 38 by the crank action of the frame 20. After the chains 76 are disconnected from the sections 80, the carrier is drawn forwardly over the implement 78. If desired, the implement 78 will collapse the same due to the normal ing position in order to maintain the sections 80 out of contact with the ground surface 86. For this purpose, the aforementioned pin 72 is insertable through the sleeve 64 and the tubular member 50 to prevent counterclockwise pivoting of the wheels 18 about the axle 14 when the hydraulic cylinder 34 is inoperative or is removed from the carrier.

To facilitate ready removal of the cylinder 34 when the carrier is stored in the transporting position shown in FIG. 2 with pin 72 in place, the member 54 may be completely withdrawn from the rigidly held tubular member 50 of the push rod 36 by collapsing cylinder 34. Such withdrawal of the member 54 relieves any appreciable axially applied loading on the cylinder-securing pins or bolts 44 and 48 thereby facilitating removal of the same without destructive hammering.

Throughout the construction of the preferred embodiment of the carrier, low cost standard materials such as pipe, flat stock, and channel members have been employed where possible. Due to the simplicity of the carrier construction, it may be quickly and economically fabricated by welding and by the use of ordinary fasteners. Furthermore, the simplicity of construction of the present invention facilitates maintenance and repair of the carrier by inexpert persons having limited available facilities. Moreover, the mode of operation of the carrier is readily understandable by inexperienced operators.

Since the illustrative carrier is intended solely for transporting implements from place to place and does not comprise a structural or operational component of the implement itself, it is possible to give special consideration to the solution of the problems involved in transporting extremely wide multisection implements. In this regard, the present invention displays several particularly desirable characteristics not found in other carriers. First of all, since it is not intended that my carrier support or pull the implement 78 under working conditions, the carrier is not subjected to any of the high order loads and shocks normally borne by the implement during field tillage operations. Therefore, the size, weight and ruggedness of the carrier structure need only be sufficient to support the weight of the implement 78. Consequently, my carrier may be constructed more lightly, hence more economically, than conventional carriers. Thus, the illustrative carrier comprises but a single structural member, center member 10, to which all of the sections 80 are readily detachably secured rather than a conventional box frame or the like to which implement sections are rigidly bolted or welded. Since my invention provides a true carrier rather than an implement pulling device, the sections may be disposed sideways relative to the movement of the carrier thereby drastically reducing the width of the carried load and eliminating the need for folding or disassembling the outboard implement sections. Moreover, the center member 10 may be made long enough to support any number of side-by-side sections.

It will be understood that the above description and accompanying drawings comprehend only general and preferred embodiments of the invention and that various changes in construction, proportion, material and arrangement of the elements thereof may be made without sacrificing any of the above enumerated advantages or departing from the scope of the appended claims.

Having fully described the invention, what is claimed as new and useful is:

1. A carrier for a farm implement having a multiplicity of sections ganged laterally and having a substantial side-to-side dimension which is perpendicular to the normal working path of the implement; comprising:
    (a) an elongate center member;
    (b) crank means pivotally journaled relative to said center member and carrying spaced ground-engaging wheels for supporting said center member above the ground surface;
    (c) power means operatively connected to said crank means for pivoting the same whereby said center member is raised and lowered selectively;
    (d) force-transmitting means connected between said power means and said crank means for pivoting the latter and including a pair of aligned members one telescoping about the other;
    (e) sleeve means rigidly attached to said center member and having one of said aligned members slidably received therein;
    (f) securing means insertable through said sleeve means and said one of said aligned members to prevent relative movement therebetween;
    (g) said elongate center member having its longitudinal center line disposed parallel to the side-to-side dimension of said implement whereby said implement is carried sideways by said carrier; and
    (h) connecting means engageable with said implement for detachably securing the same to a plurality of spaced points along the length of the center member.

2. An implement carrier comprising:
    (a) a center member;
    (b) crank means pivotally journaled relative to said center member and carrying spaced ground-engaging wheels for supporting said center member above the ground surface;
    (c) power means operatively connected to said crank means for pivoting the same whereby said center member is raised and lowered selectively;
    (d) force-transmitting means connected between said power means and said crank means for pivoting the latter and including a pair of aligned members one telescoping about the other;
    (e) sleeve means attached to said center member and having one of said aligned members slidably received therein;
    (f) means engaging with said sleeve means and said one of said aligned members to prevent relative movement therebetween.

3. An implement carrier comprising:
    (a) a center member;
    (b) crank means pivotally journaled relative to said center member and carrying spaced ground-engaging wheels for supporting said center member above the ground surface;
    (c) power means operatively connected to said crank means for pivoting the same whereby said center member is raised and lowered selectively;
(d) force-transmitting linkage connected between said power means and said crank means for pivoting the latter;
(e) sleeve means carried by said center member and said force-transmitting linkage being movable relative to said sleeve;
(f) means connectable with said sleeve means and said force-transmitting linkage to prevent relative movement therebetween.

References Cited

UNITED STATES PATENTS

| | | | |
|---|---|---|---|
| 2,533,999 | 12/1950 | Colley | 254—139.1 |
| 2,606,001 | 8/1952 | Lepper | 280—414 |
| 2,625,372 | 1/1953 | Yerian | 254—139.1 |
| 2,767,538 | 8/1956 | Scheidenhelm | 172—328 X |
| 2,780,475 | 2/1957 | Koerner | 280—414.5 |
| 2,866,281 | 12/1958 | Breux | 172—328 X |

LEO FRIAGLIA, *Primary Examiner.*